United States Patent [19]
McKee et al.

[11] 3,761,164
[45] Sept. 25, 1973

[54] AUTOMATICALLY CONTROLLED MIRRORS

[76] Inventors: Clyde M. McKee, 22175 Bernard St., Taylor, Mich. 48180; Ward Scott, 429 Rochdale Dr., Rochester, Mich. 48063; Sandor Shapiro, 24811 Templar, Southfield, Mich. 48075

[22] Filed: Mar. 27, 1972

[21] Appl. No.: 238,093

[52] U.S. Cl. ............... 350/307, 350/289, 350/304, 74/501 M
[51] Int. Cl. ............................................. G02b 5/08
[58] Field of Search .................... 350/289, 307, 304; 74/501 M, 88, 112

[56] References Cited
UNITED STATES PATENTS
3,640,609  2/1972  Mckee ............................ 350/307
321,432  7/1885  Gill .................................. 74/501
2,962,933  12/1960  Hezler, Jr. ....................... 74/501

*Primary Examiner*—David Schonberg
*Assistant Examiner*—Michael J. Tokar
*Attorney*—Robert C. Hauke et al.

[57] ABSTRACT

A mirror assembly for trucks or the like actuated in response to movement of the steering wheel to move to a position providing maximum visibility. Means are clamped to a member which is a part of the steering mechanism and which is movable upon rotation of the steering wheel to produce a corresponding pivotal movement in an arm member pivotally mounted to the vehicle. The arm member is connected to a cable system through a slide member having a V-shaped slot to produce linear movement of a cable assembly in the same direction upon pivotal movement of the arm member in either a clockwise or a counterclockwise direction. The cable assembly is connected to pivotally mounted exterior mirrors for the vehicle.

10 Claims, 6 Drawing Figures

AUTOMATICALLY CONTROLLED MIRRORS

CROSS REFERENCE TO RELATED APPLICATIONS

The present application is related in substance to U. S. Pat. No. 3,536,382 issued Oct. 27, 1970; U. S. Pat. No. 3,527,528 issued Sept. 8, 1970; U. S. Pat. No. 3,640,608 issued Feb. 8, 1972; and U. S. Pat. No. 3,640,609 issued Feb. 8, 1972.

BACKGROUND OF THE INVENTION

1. Field of the Invention

The present invention relates to exteriorly mounted rear view mirrors for trucks and the like, and more particularly to means for automatically varying the position of the mirrors in response to movement of the steering wheel.

2. Description of the Prior Art

Means have been heretofore provided to produce movement of exteriorly mounted mirrors for articulated vehicles such as tractor-trailer combinations as the vehicle is turning so that the rear of the vehicle remains in the vision of the driver throughout the turn. The problem of seeing the rear side of the trailer is particularly difficult if the articulated vehicle is long and when a right-hand turn is being made. In such situations, the setting of the mirror necessary for straight-ahead driving causes the right-hand mirror to be directed against the side of the trailer when a right-hand turn is being made. The left-hand mirror in such situations is also of little use since it is directed toward an area away from the left side of the trailer throughout much of the turn.

Similarly, when making a left-hand turn, the left-hand mirror will be directed against the left side of the trailer and the right-hand mirror will be well away from the right side of the trailer. This is not as critical as the right-hand situation because the driver is positioned on the left side of the vehicle and is, therefore, in better position to see that side of the vehicle.

Previous attempts to provide a solution to this problem have not met with success for several reasons. Prior to the aforementioned patents, there has been no apparatus for ready attachment to existing trucks and mirror assemblies to convert them to automatically actuated devices. Such apparatus as has been previously suggested has required that the units be built into the structure of the truck itself with extensive and expensive modifications being made on the vehicle to install new mirror assemblies to replace those already provided.

Further, the actuating mechanism for previously automatically controlled mirror assemblies, in addition to requiring completely integrated mirror units, have also employed gearing arrangements which have made them quite expensive and subject to malfunction. The previously mentioned patents disclose apparatus solving these problems by providing mechanism which can be readily connected between existing portions of the steering mechanism and mirror assemblies commonly used in truck and trailer combinations to provide a movement of the mirrors in response to steering wheel movement in a manner to provide increased visibility while turning. Relatively inexpensive mechanism is employed for producing the movement of the mirrors.

While such apparatus has been generally satisfactory, the present invention provides a substantial improvement over apparatus of the aforementioned patents by providing a simplified mechanism for translating movement of the steering mechanism to movement of the mirrors. Further, the apparatus of the aforementioned patents is especially suitable for attachment to portions of the steering mechanism, such as the Pittman arm, which are pivotally mounted. Attachment to the Pittman arm is not always possible so there is a need for an assembly which can be attached to other moving portions of the steering mechanism.

Further, the slide mechanism for producing movement of the mirrors in the same direction regardless of the direction of turning of the vehicle has been simplified and is capable of being used to manually adjust the position of the mirrors.

SUMMARY OF THE PRESENT INVENTION

The present invention provides an actuating mechanism, which, like that of the previously disclosed apparatus, can be readily connected between existing members of the steering mechanism and mirror assemblies commonly used in truck and trailer combinations to provide pivotal movement of the mirrors in response to steering wheel movement in a manner which provides maximum visibility. The apparatus of the present invention is operable to rotate the mirrors in the same direction each time the vehicle is turned. However, to produce maximum visibility, each mirror is rotated away from the vehicle. This, as has been previously pointed out, has been found to provide a greater range of visibility by maintaining a view by way of the mirror on the side opposite the turning side through a major portion of the turn.

To accomplish this, the present invention includes a first member adapted to be clamped to either a pivotally mounted portion of the steering mechanism, such as the Pittman arm, or to a linearly movable portion of the steering mechanism such as the tie rod. The first member engages with one arm of an L-shaped pivotally mounted member to produce pivotal movement of the arm of the L-shaped member upon movement of the first member. One arm of the L-shaped member registers with a V-shaped slot formed in a slide member which has upturned portions connected with the cable assembly connecting the slide member to the mirrors. In this way pivotal movement of the L-shaped member in either direction causes the slide member to be moved by reason of the coaction of the slot formed in the slide member and the L-shaped member to produce a corresponding linear movement of the cable assembly in the same direction and thus rotational movement of the mirrors in the same direction regardless of the direction of rotation of the arm member. The slide member having the V-shaped slot can be used to produce pivotal movement of the mirrors to an adjusted position by manual actuation of the L-shaped member through a control cable or the like.

DESCRIPTION OF THE DRAWINGS

A more complete understanding of the present invention will be apparent from the following description of a preferred embodiment of the present invention. The description makes reference to the accompanying drawings in which like reference characters refer to like parts throughout the several views and in which.

DESCRIPTION OF A PREFERRED EMBODIMENT

Figure 1:
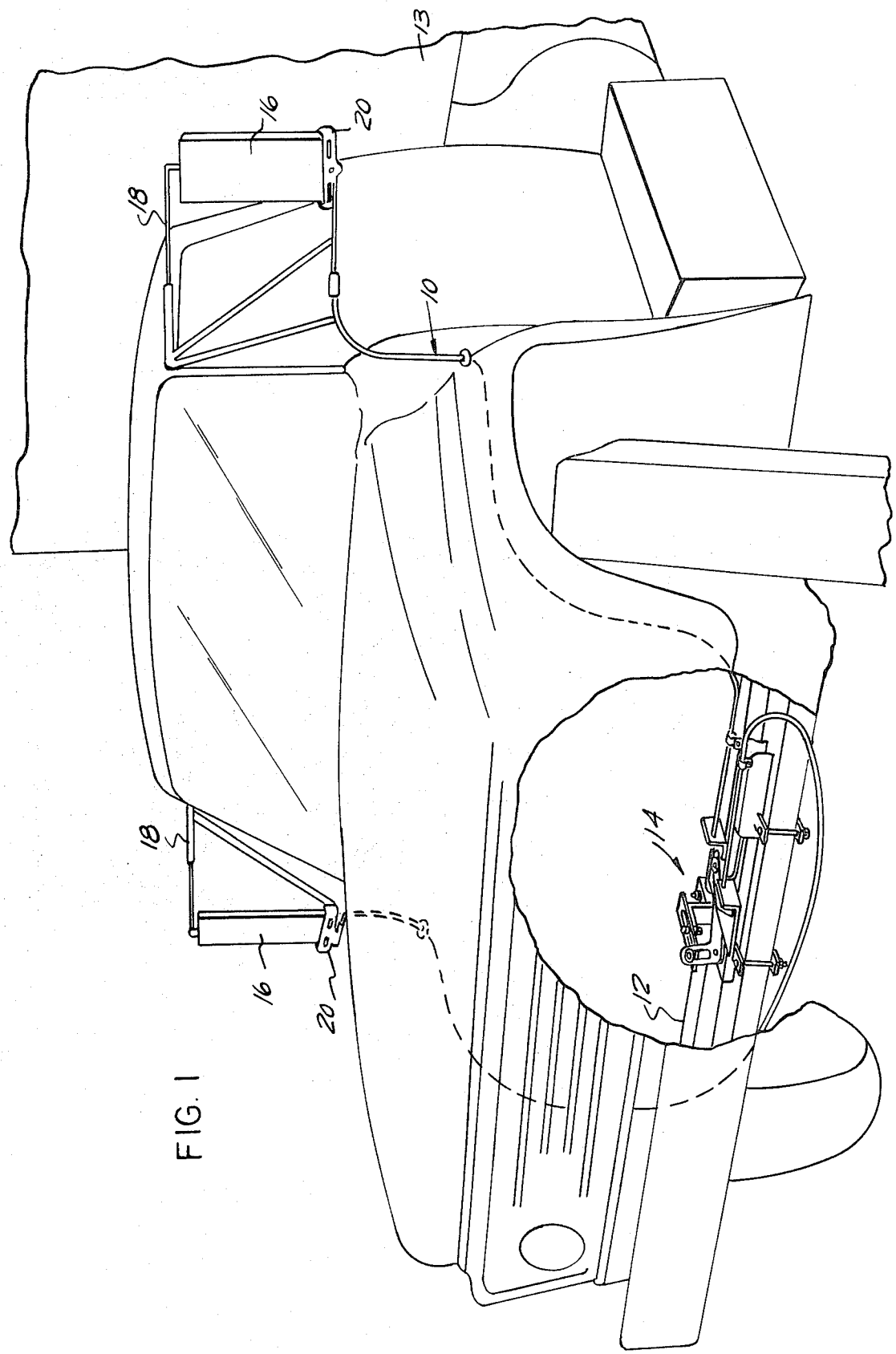
FIG. 1 is a front perspective view of the mirror assembly of the present invention mounted to a truck and with portions of the truck removed for purposes of clarity.

Now referring to the drawings for a more detailed description of the present invention, a preferred embodiment thereof is illustrated in FIGS. 1-4 as comprising a cable assembly, generally indicated by reference numeral 10, connected at one end to a portion of the steering mechanism such as a tie rod 12 through a slide mechanism indicated generally at 14 and to the opposite end to mirrors 16 (FIG. 1) pivotally mounted exteriorly of the truck 13 by brackets 18. Clamps 20, similar to those disclosed in the aforementioned patents, provide the means for attaching the end of the cable assembly 10 to the mirrors 16.

Figure 2:
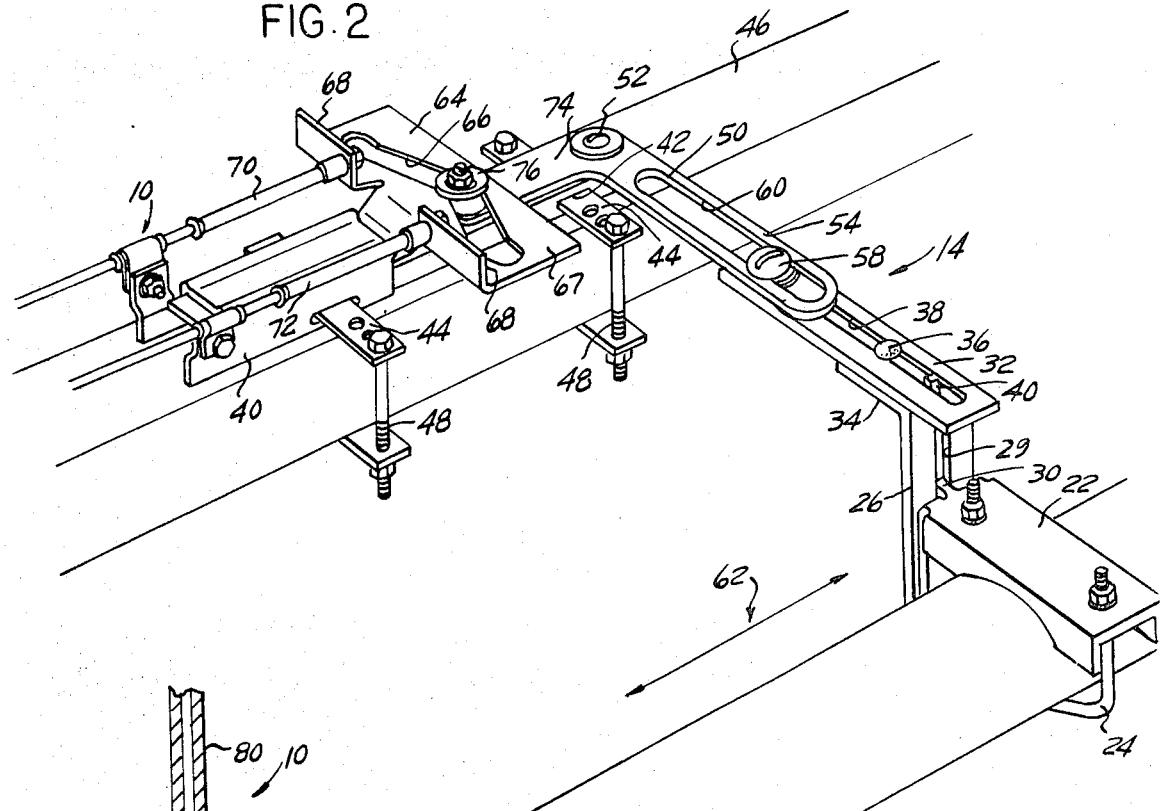
FIG. 2 is an enlarged perspective view of the slide mechanism of the present invention.
Figure 3:
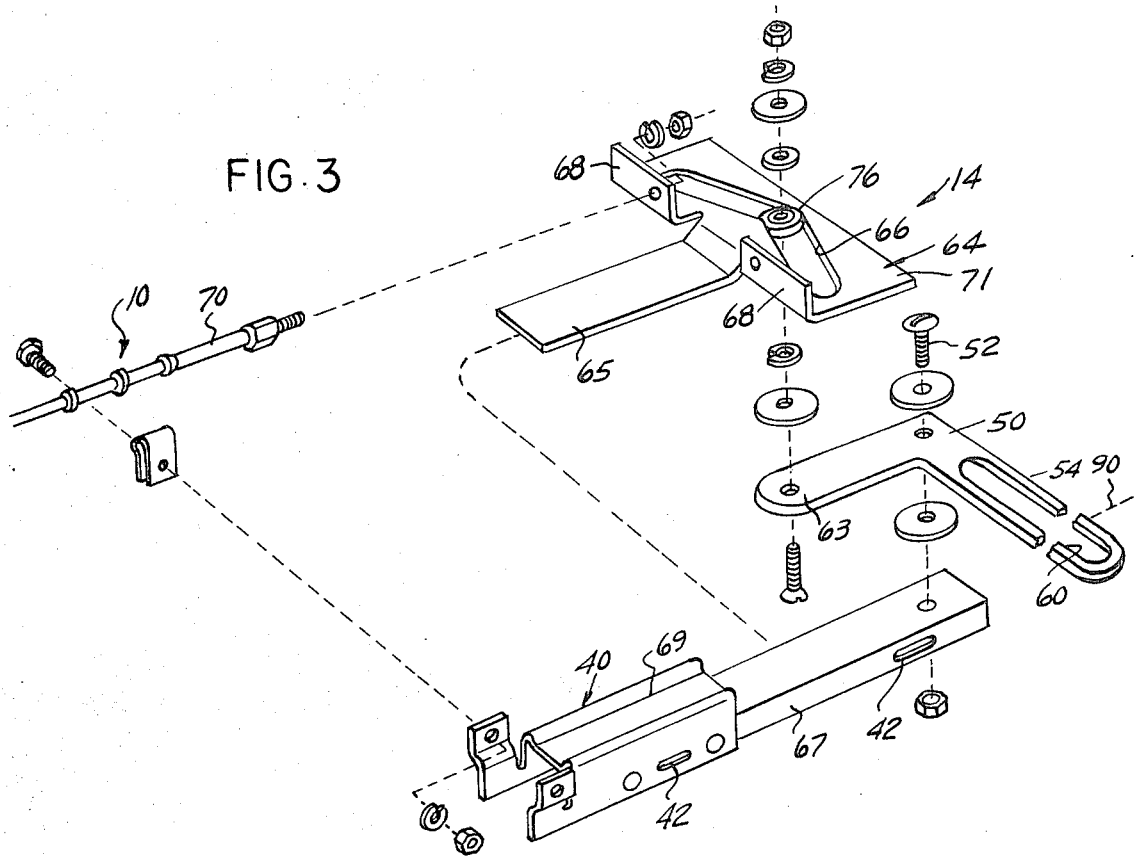
FIG. 3 is an exploded view of a portion of the assembly shown in FIG. 2.
Figure 4:
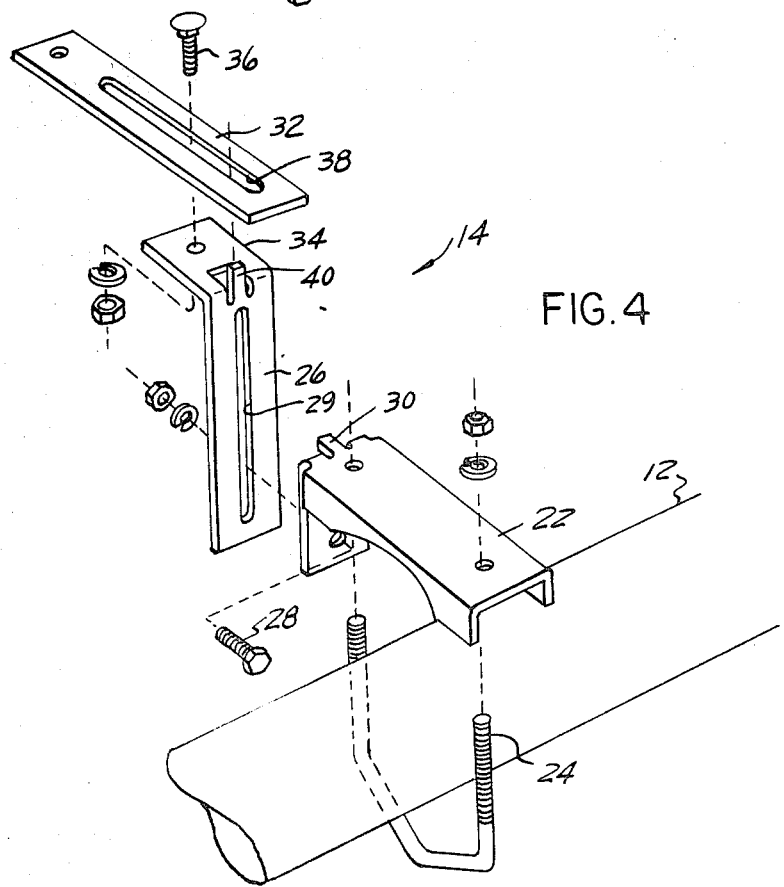
FIG. 4 is an exploded view of another portion of the assembly shown in FIG. 2.

As can best be seen in FIGS. 2, 3 and 4, the slide mechanism 14 preferably comprises a guide bracket 22 adapted to be mounted to the tie rod 12 by a U-bolt 24. It is to be understood that the guide bracket 22 could be connected to other movable parts of the steering mechanism such as the Pittman arm (not shown). An L-shaped angle bracket 26 is adjustably mounted to one side of the guide bracket 22 by means of a fastener 28 (FIG. 4) extending into a slot 29 formed in the angle bracket 26. A tab 30, extending from one end of the guide bracket 22, extends into the slot 29.

A guide arm 32 is mounted to the upper leg 34 of the angle bracket 26 by means of a fastener 36 extending into an elongated slot 38 formed in the guide arm 32. The slot 38 provides an adjustable mounting between the angle bracket 26 and the guide arm 32. A tab 40, extending upwardly from the angle bracket 26, extends into the slot 38 to provide additional support for the connection between the angle bracket 26 and the guide arm 32.

As can best be seen in FIGS. 2 and 3, the slide assembly 14 further comprises a base assembly 40 provided with slots 42 for receiving straps 44 (FIG. 2) for clamping the base assembly 40 to the axle 46 of the truck 13. Bolts 48 are provided to clamp the straps 44 around the axle 46.

An L-shaped arm member 50 is pivotally mounted to the base assembly 40 by bearing fastener 52 and has an elongated arm 54 normally extending at right angles to the axle 46 to a point above the guide arm 32. A bearing member 58 (FIG. 2) is mounted to the guide arm 32 and is received in an elongated slot 60 formed in the arm 54 of the L-shaped member 50 so that movement of the tie rod 12 in a direction indicated by the arrow 62 in FIG. 2 causes the arm 54 to slide on the bearing member 58 to produce pivotal movement of the arm member 50 about the bearing fastener 52. The L-shaped arm member 50 has a second arm 63 normally disposed parallel to the axle 46.

As can best be seen in FIGS. 2 and 3, a substantially T-shaped slide plate 64 is slidably mounted to the base assembly 40 by means of a tongue portion 65 (FIG. 3) slidably receivable between a base 67 and an upwardly spaced housing 69 formed at one end of the base assembly 40. The slide plate 64 is provided with a substantially V-shaped slot 66 formed in the head portion 71 thereof. Upturned flanges 68 provide the means for attaching cables 70 and 72 of the cable assembly 10 to the slide plate 64. The arm 63 of the L-shaped arm member 50 carries a bearing member 76 which extends into the slot 66 so that rotation of the arm member 50 about the bearing fastener 52 causes the bearing member 76 to climb outwardly along one of the legs of the V-shaped slots 66 (depending upon which direction the arm member 50 is being rotated) and to move the cables 70 and 72 to the right as shown in FIG. 2 regardless of the direction of rotation of arm member 50.

It is apparent then that regardless of the direction of the turn and thus the direction of movement of the tie rod 12, the cables 70 and 72 will be actuated in the same direction and will be pulled to a degree which depends only upon the amount of movement of the tie rod 12 and thus the extent of the turning of the vehicle 13. The cables 70 and 72 are, of course, attached to the mirrors 16 by the clamps 20 so that movement of these cables is translated to corresponding pivotal movement of the mirrors.

Figure 5:
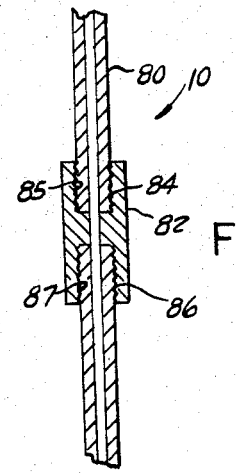
FIG. 5 is an enlarged cross-sectional view of a portion of the cable assembly of the present invention.
Figure 6:
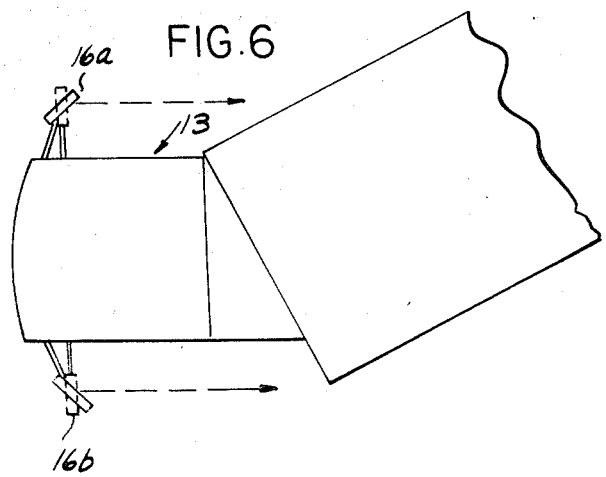
FIG. 6 is a schematic view illustrating the manner of operation of the mirror assembly utilizing the actuating means of the present invention.

The rotational movement of the mirrors is illustrated schematically in FIG. 6 in which, regardless of the direction of turning, the mirrors 16a and 16b will rotate from the solid line position shown to the position shown in phantom away from the vehicle 13. That is, the left-hand mirror 16b will rotate clockwise away from the vehicle 13 whether the turn is to the right or to the left and the right-hand mirror 16a will rotate counterclockwise regardless of the direction of the turn. The degree of rotation of the mirrors 16a and 16b, however, will depend upon the degree of turning and by a proper adjustment of the position of the clamping assembly 20, by adjustment between the guide arm 32, the L-shaped arm member 50 and the angle bracket 26, as well as by adjustment of the length of the outer housing 80 of the cables 70 and 72 by an adjustment nut 82 shown in FIG. 5, the correspondence between the rotation of the steering wheel and the rotation of the mirrors to produce a maximum visibility throughout any turn can be achieved.

As shown in FIG. 5, the housing 80 is separated and is provided with threaded end portions 84 and 86. The nut 82 is provided with threaded internal portions 85 and 87 which are threaded in the opposite directions so that turning the nut 82 in one direction brings the end portions 84 and 86 together, while turning the nut in the opposite direction separates the end portions 84 and 86 to thereby effectively shorten or lengthen the connection between the mirrors 16a or 16b and the slide plate 64.

While the assembly of the present invention is intended primarily to provide automatic adjustment of the mirrors, the arm member 54 and the slide plate 64 can be used to provide a means of manually adjusting the mirrors. In such a construction, the guide bracket 22, the angle bracket 26 and the guide arm 32 would not be used and a cable 90 would be attached directly to the arm member 50, as shown schematically in FIG. 3. The cable 90 would be of the Bowden type and would extend to the instrument panel (not shown) of the vehicle 13 to permit manual adjustment of the mirrors 16a and 16b by manual manipulation of the cable 90. The advantage of this assembly would be, of course, that the mirrors 16a and 16b would be adjusted toward or away from the side of the vehicle 13 together and by actuation of a single cable 90.

It is apparent that we have described an improved construction over those mirror assemblies shown in the aforementioned patents. The construction of the slide assembly of the present invention, as well as the number of places where adjustments can be made, permits the use of the device of the present invention on vehicles of many different kinds. Also, the slide assembly of the present invention is relatively inexpensive to produce and performs with little chance of malfunction.

It is apparent also that although we have described but a single embodiment of our invention, many changes and modifications can be made without departing from the spirit of the invention or the scope of the appended claims.

We claim:

1. Means for connecting a pair of pivotally mounted rear view mirrors to a vehicle to produce pivotal movement of the mirrors as the vehicle turns, said vehicle having steering mechanism which includes a first member movable in response to the turning of the vehicle, said means comprising first means connected with said first member and movable about a pivot point in response to movement of said first member, said first means including an arm member extending outwardly from said pivot point, cable members connected with said mirrors and operable upon extension and retraction of said cables to produce rotation of said mirrors, a slide assembly connected between said arm member and said cables and comprising a fixedly mounted base assembly and a slide member slidably mounted to said base assembly and operable to slide in one direction upon movement of said arm member in a pivotal direction away from a normal position regardless of the direction of pivotal movement of said arm member, said slide member having a V-shaped slot and a member carried by said arm member and extending into said slot to be positioned in the base of said V-shaped slot when said arm member is in said normal position and said V-shaped slot being disposed with the legs of said slot facing outwardly toward said cable members whereby upon pivotal movement of said arm member in either direction said slide member is moved in a direction away from said cables.

2. The combination as defined in claim 1 and including a clamp member engaging said mirror and said cable member being connected to said clamp member whereby axial movement of said cable member causes the mirror to pivot.

3. The combination as defined in claim 1 and in which said first member is a tie rod for said vehicle and said first means includes an angle bracket mounted to said tie rod and extending outwardly therefrom to be slidably pivotally engaged with said arm member.

4. The combination as defined in claim 1 and including means for adjusting the length of the housing for said cables.

5. The combination as defined in claim 1 and in which said a base assembly is adapted to be mounted to the axle of said vehicle and said first member comprises the tie rod of said vehicle.

6. Means for connecting a pair of pivotally mounted rear view mirrors to a vehicle to produce pivotal movement of said mirrors, said means comprising a first linearly movable member, said means movable about a pivot point in response to movement of said first member, said first means including an arm member extending outwardly from said pivot point, cable members connected with said mirrors and operable upon extension and retraction of said cables to produce rotation of said mirrors, a slide assembly connected between said arm member and said cables and including a slidably mounted slide member and means pivotally connecting said arm member and said slide member, said slide member having a V-shaped slot and a means carried by said arm member and extending into said slot to be positioned in the base of said V-shaped slot when said arm member is in said normal position, whereby pivotal movement of said arm member moves the means carried by said arm member into one leg of said V-shaped slot depending upon the direction of rotation of said arm member and said slide member is slidably moved in the same direction regardless of the direction of rotation of said arm member to thereby move such cables and rotate said mirrors in the same direction regardless of the direction of rotation of said arm member.

7. The combination as defined in claim 6 and including a clamp member engaging said mirror and said cable member being connected to said clamp member whereby axial movement of said cable member causes the mirror to pivot.

8. The combination as defined in claim 6 and in which said first member is a cable and said first means includes an angle bracket, said cable being connected to said arm member to produce pivotal movement thereof upon actuation of said cable.

9. The combination as defined in claim 6 and including means for adjusting the length of the housing for said cables.

10. The combination as defined in claim 1 and in which said first means includes a base assembly adapted to be mounted to the axle of said vehicle.

* * * * *

UNITED STATES PATENT OFFICE
CERTIFICATE OF CORRECTION

Patent No. 3,761,164        Dated September 25, 1973

Inventor(s) Clyde M. McKee, Ward Scott, Sandor Shapiro

It is certified that error appears in the above-identified patent and that said Letters Patent are hereby corrected as shown below:

Column 3, line 51, after "42", insert --(FIG. 3)--.

Column 3, line 52, after "46", insert --(FIG. 2)--.

Signed and sealed this 2nd day of July 1974.

(SEAL)
Attest:

EDWARD M. FLETCHER, JR.
Attesting Officer

C. MARSHALL DANN
Commissioner of Patents